United States Patent
Yazaki et al.

(10) Patent No.: US 8,267,382 B2
(45) Date of Patent: Sep. 18, 2012

(54) METHOD OF ASSEMBLING A HYDRAULIC SHOCK ABSORBER AND HYDRAULIC SHOCK ABSORBER

(75) Inventors: Ryu Yazaki, Yokohama (JP); Atsushi Maeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 811 days.

(21) Appl. No.: 12/232,174

(22) Filed: Sep. 11, 2008

(65) Prior Publication Data
US 2009/0107780 A1    Apr. 30, 2009

(30) Foreign Application Priority Data
Oct. 31, 2007    (JP) .................................. 2007-284509

(51) Int. Cl.
*F16F 9/08*    (2006.01)
(52) U.S. Cl. ............... 267/64.17; 267/64.19; 267/64.23; 188/315; 141/349
(58) Field of Classification Search .................. 188/298, 188/315, 300; 267/64.16, 64.17, 64.12, 64.19, 267/64.23; 280/5.507, 6.157, 6.159, 124.104, 280/276; 141/37, 67, 98, 269, 349, 383; 29/446
See application file for complete search history.

(56) References Cited

U.S. PATENT DOCUMENTS

| | | | | |
|---|---|---|---|---|
| 3,272,495 A | * | 9/1966 | Axthammer | 267/64.16 |
| 3,391,922 A | * | 7/1968 | Axthammer | 267/64.17 |
| 3,799,528 A | * | 3/1974 | Allinquant et al. | 267/64.17 |
| 3,831,919 A | * | 8/1974 | Nicholls | 267/34 |
| 3,837,444 A | * | 9/1974 | Allinquant et al. | 188/315 |
| 3,904,183 A | * | 9/1975 | Allinquant et al. | 267/64.17 |
| 4,131,139 A | * | 12/1978 | Tanabe | 141/4 |
| 4,262,779 A | * | 4/1981 | Katsumori et al. | 188/315 |
| 4,483,377 A | * | 11/1984 | Cubalchini | 141/349 |
| 4,491,160 A | * | 1/1985 | Axthammer et al. | 141/349 |
| 5,195,766 A | * | 3/1993 | Dohrmann et al. | 280/276 |
| 5,988,655 A | * | 11/1999 | Sakai et al. | 280/6.159 |

(Continued)

FOREIGN PATENT DOCUMENTS
JP    9-144801    6/1997
(Continued)

OTHER PUBLICATIONS

Japanese Office Action (with English translation) issued Sep. 14, 2011 in corresponding Japanese Patent Application No. 2010-236416.

(Continued)

*Primary Examiner* — Christopher Schwartz
(74) *Attorney, Agent, or Firm* — Wenderoth, Lind & Ponack, LLP (57) ABSTRACT

Before inner components of a hydraulic shock absorber, such as a cylinder, a piston and a piston rod, are placed, an outer shell is joined with a joint portion of an assembling apparatus so that a gas pressure chamber and the outer shell are in communication with each other. A low-pressure gas is supplied in the gas pressure chamber and the outer shell. Under a pressure of the low-pressure chamber, an oil tank subassembly is inserted in the outer shell and is fitted therein to form an oil tank. The oil tank is divided into an oil chamber and a gas chamber by a diaphragm. By this assembling method, it is possible to supply the low-pressure gas into the gas chamber without a need for a gas-supplying hole for supplying the gas into the gas chamber.

17 Claims, 5 Drawing Sheets

U.S. PATENT DOCUMENTS 7,837,180 B2 * 11/2010 Jordan ................. 267/64.26

FOREIGN PATENT DOCUMENTS

| JP | 9-277814 | 10/1997 |
| JP | 10-138730 | 5/1998 |
| JP | 2002-81481 | 3/2002 |
| JP | 2006-118617 | 5/2006 |

OTHER PUBLICATIONS

Japanese Office Action mailed Nov. 9, 2011 (with English translation) in corresponding Japanese Patent Application No. 2007-284509.

* cited by examiner

METHOD OF ASSEMBLING A HYDRAULIC SHOCK ABSORBER AND HYDRAULIC SHOCK ABSORBER

BACKGROUND OF THE INVENTION

The present invention relates to a hydraulic shock absorber.

Conventionally, there is proposed a so-called self-leveling hydraulic shock absorber, i.e., a hydraulic shock absorber having a self-leveling function for automatically maintaining a constant standard height of a vehicle, an example of which is a hydraulic shock absorber disclosed in Japanese Patent Application Public Disclosure Hei 10-138730.

The self-leveling hydraulic shock absorber disclosed in Japanese Patent Application Public Disclosure Hei 10-138730 comprises a pumping means for supplying a hydraulic fluid in an oil tank into a cylinder by utilizing extension and contraction of a piston rod, and a returning means for returning the pressure hydraulic fluid from the pumping means and the cylinder into the oil tank according to a position of the extending and contracting piston rod. Oscillation of a suspension apparatus while the vehicle is running actuates the pumping means and the returning means, whereby a constant standard height of the vehicle is automatically maintained by appropriately adjusting a pressure in the cylinder to maintain a constant extension length of the piston rod.

In such a self-leveling hydraulic shock absorber, an inside of an oil tank or a reservoir is divided into a plurality of chambers by a diaphragm (flexible membrane) or a free piston. A gas is sealingly contained in one of the chambers, and a hydraulic fluid is sealingly contained in the other of the rooms, so that the gas is prevented from mixing with the hydraulic fluid.

In some conventional hydraulic shock absorbers, an oil tank or a reservoir is divided into a plurality of gas chambers by a diaphragm or a free piston. A first gas having a first pressure is sealingly contained in one of the gas chambers, and a second gas having a second pressure which is different from the first pressure is sealingly contained in the other of the gas chambers. In such a conventional hydraulic shock absorber, a gas-supplying hole is formed through an outer wall of a cylinder to supply a gas having a predetermined pressure into the gas chamber in the oil tank or the reservoir. In making the hydraulic shock absorber, after the hydraulic shock absorber is assembled by placement of components, the gas having the predetermined pressure is supplied from the gas-supplying hole into the gas chamber, and then a plug is welded in the gas-supplying hole to sealingly close the gas chamber. However in this method, undesirable effects may be caused as a result of heat and sputter generated by welding, such as deterioration of the rubber diaphragm or malfunction of the sliding surface of the free piston. In addition, contact of the tip of the plug might damage the diaphragm.

SUMMARY OF THE INVENTION

The present invention has been contrived in consideration of the above-mentioned circumstance, and an object thereof is to provide a method of assembling a hydraulic shock absorber and a hydraulic shock absorber in which a need for a gas-supplying hole for supplying a gas into a gas chamber is obviated.

To solve the foregoing and other problems, an aspect of the present invention is a method of assembling a hydraulic shock absorber, comprising:

providing a bottomed cylindrical outer shell having an opening at one end;

introducing a first gas having a first pressure from the opening into the outer shell;

inserting a dividing member into the outer shell under the pressure of the first gas to define a gas chamber in the outer shell, such that the first gas is sealingly contained in the gas chamber;

supplying a hydraulic fluid into the outer shell; and supplying into the outer shell a second gas having a second pressure which is different from the first pressure.

A hydraulic shock absorber with regard to the present invention can be made by the above-mentioned assembling method, without providing a gas-supplying hole for a gas chamber.

The dividing member may comprise a flexible membrane.

The dividing member may comprise a free piston.

The opening at the one end of the outer shell may be sealingly closed by a sealing device after the second gas is supplied.

The second gas may be supplied after the opening at the one end of the outer shell is sealingly closed by a sealing device.

Another aspect of the present invention is a method of assembling a hydraulic shock absorber having:

a bottomed cylindrical outer shell having an opening at one end;

a cylinder disposed in the outer shell and sealingly containing a hydraulic fluid;

a piston slidably fitted in the cylinder;

a piston rod having one end coupled with the piston, and an opposite end extending to the outside of the cylinder;

a damping force generating mechanism operable to generate a damping force by controlling a hydraulic fluid flow generated by a movement of the piston;

a cylindrical chamber defined between the outer shell and the cylinder;

a first chamber defined in the cylindrical chamber, the first chamber comprising a gas chamber which is disposed on an outer circumferential side of the first chamber and in which a first gas is sealingly contained, an oil chamber disposed on an inner circumferential side of the first chamber, and a substantially cylindrical diaphragm dividing the inside of the first chamber into the gas chamber and the oil chamber;

a second chamber defined in the cylindrical chamber, the second chamber containing a mixture of a hydraulic fluid and a second gas;

a communication passage connecting one of the first and second chambers, and the inside of the cylinder;

a pumping mechanism operable to supply the hydraulic fluid in the other of the first and second chambers into the cylinder by utilizing extension and contraction of the piston rod; and a returning mechanism operable to discharge the hydraulic fluid in the cylinder into the other of the first and second chambers by opening when the piston rod extends more than a predetermined value. The method comprises:

introducing the first gas into the outer shell;

inserting the diaphragm into the outer shell under a pressure of the first gas;

inserting the cylinder into the outer shell;

supplying the hydraulic fluid into the cylinder; and supplying the second gas into the second chamber.

The first chamber may be formed on a bottom side of the outer shell.

The cylindrical member for defining the oil chamber may be disposed inside the diaphragm, and the communication passage may be defined between the cylindrical member and the cylinder.

The cylindrical member and the diaphragm may be subassembled.

Small-diameter portions may be formed at two axial portions of the outer shell, and each end of the diaphragm may be sealingly held by the small-diameter portions.

The first gas may be introduced into the gas chamber when the diaphragm is inserted beyond one of the small-diameter portions.

The opening at the one end of the outer shell may be sealingly closed by a sealing device after the second gas is supplied.

The second gas may be supplied after the opening at the one end of the outer shell is sealingly closed by a sealing device.

Still another aspect of the present invention is a hydraulic shock absorber comprising:
 a cylinder sealingly containing a hydraulic fluid;
 a piston slidably fitted in the cylinder;
 a piston rod having one end coupled with the piston, and an opposite end extending to the outside of the cylinder;
 a damping force generating mechanism operable to generate a damping force by controlling a hydraulic fluid flow generated by a movement of the piston;
 a reservoir connected to the cylinder and sealingly containing a hydraulic fluid and a gas;
 an oil tank in which a hydraulic fluid is reserved; and
 a self-leveling mechanism operable to adjust an extension length of the piston rod by supplying and receiving the hydraulic fluid between the cylinder and the oil tank by utilizing extension and contraction of the piston rod. In the hydraulic shock absorber, an outer shell is disposed around the cylinder to define a chamber between the cylinder and the outer shell;
 a partition member is inserted between the cylinder and the outer shell so that the inside of the chamber is divided into a first chamber and a second chamber by the partition member;
 the inside of the first chamber is divided into an oil chamber and a gas chamber by a movable dividing member;
 a gas having a predetermined pressure is sealingly contained in the gas chamber; and
 the gas is supplied into the gas chamber by inserting the dividing member into the outer shell under the pressure of the gas having the predetermined pressure, without providing a gas-supplying hole for supplying the gas.

The partition member may have a cylindrical shape, and may be prevented from moving out of the outer shell after being inserted in the outer shell due to the pressure of the gas in the gas chamber.

The partition member may be air-tightly fitted at a lower end portion and an intermediate portion of the outer shell, and an axial force generated by a difference between a pressure receiving area at a fit portion of the partition member to the lower end portion and a pressure receiving area at a fit portion of the partition member to the intermediate portion may be less than a frictional force at the fit portions.

The difference between the pressure receiving areas may be zero.

DETAILED DESCRIPTION OF THE INVENTION

Hereinafter, preferred embodiments of the present invention will be described in detail with reference to the accompanying drawings.

Figure 2:
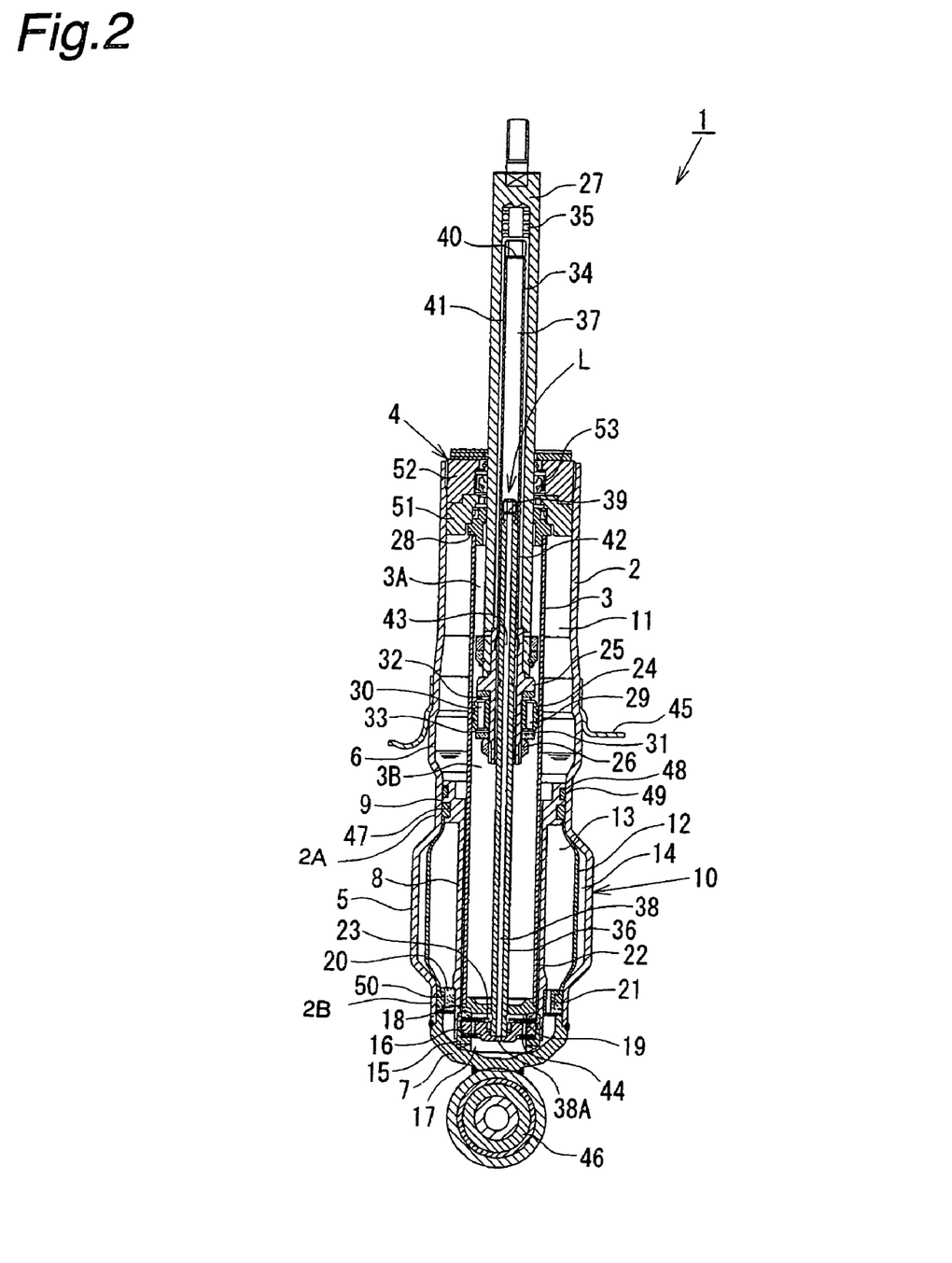
FIG. 2 is a vertical cross-sectional view of the hydraulic shock absorber with regard to the first embodiment of the present invention.

FIG. 2 shows a hydraulic shock absorber made by a method of assembling a hydraulic shock absorber according to an embodiment of the present application. As shown in FIG. 2, a hydraulic shock absorber 1 has a double-cylinder structure comprising a substantially cylindrical bottomed outer shell 2 and a cylinder 3 inserted in the outer shell 2. A seal member (sealing device) 4 is attached to an opening portion of the outer shell 2, whereby an annular chamber is defined between the outer shell 2 and the cylinder 3. A lower end side of the outer shell 2 is expanded by, for example, the bulge forming method so that a bulge portion 5 is formed thereon. A portion above the bulge portion 5 of the outer shell 2 is slightly expanded so that a spring bearing support portion 6 is formed thereon. Referring to a bottom portion of the outer shell 2, an upper end of a cap member 7 is inserted in the outer shell 2. The bottom portion of the outer shell 2 and the cap member 7 are welded together from the outside so that the bottom portion of the outer shell 2 becomes a closed end. A partition member (cylindrical member) 8 is inserted between the bulge portion 5 of the outer shell 2 and the cylinder 3. An outer flange portion 9 is formed at an upper end of the partition member 8. The outer flange portion 9 of the partition member 8 is fitted in the outer shell 2, whereby an annular chamber between the outer shell 2 and the cylinder 3 is divided into a lower oil tank 10 which faces the bulge portion 5, and an upper reservoir 11.

The oil tank 10 is divided by a flexible diaphragm 12 (flexible membrane, dividing member) into an inner oil chamber 13 and an outer gas chamber 14 (gas chamber). A hydraulic fluid is sealingly contained in the cylinder 3 and the oil chamber 13 of the oil tank 10, and a low-pressure gas (first gas) is sealingly contained in the gas chamber 14 of the oil tank 10. A mixture of a hydraulic fluid and a high-pressure gas (second gas) is sealingly contained in the reservoir 11.

An annular holding member 15 is disposed between a lower end of the partition member 8 and the cap member 7. A base guide 16 is fitted into an inner surface of the holding member 15, and an oil chamber 17 is defined between the cap member 7 and the base guide 16. A base member 18 is disposed between the base guide 16 and a lower end of the cylinder 3, and an oil chamber 19 is defined between the base guide 16 and the base member 18. An annular member 20 is fitted between a lower end portion of the outer shell 2 and the partition member 8. The annular member 20 is fixedly sandwiched between an end portion of the cap member 7 and a stepped portion formed on an outer surface of the partition member 8. The diaphragm 12 of the oil tank 10 is air-tightly clamped by the outer flange 9 of the partition member 8 and the annular member 20.

The oil chamber 17 between the cap member 7 and the base guide 16 is in communication with the oil chamber 13 of the oil tank 10 through a passage formed by cutting out a lower end side of the holding member 15, and an oil passage 21 formed through the annular member 20. The oil chamber 19 between the base guide 16 and the base member 18 is in communication with the reservoir 11 through a passage formed by cutting out a lower end side of the base member 18, and an annular oil passage 22 (communication passage) formed between the cylinder 3 and the partition member 8. The cylinder 3 is in communication with the oil chamber 19 through an orifice 23 (which will be described later) formed on a pump rod side of the base member 18 (therefore the cylinder 3 is in communication with the reservoir 11 through the annular oil passage 22).

An annular piston 24 is slidably fitted in the cylinder 3. The inside of the cylinder 3 is divided by the piston 24 into two chambers, a cylinder upper chamber 3A and a cylinder lower chamber 3B. One end of a hollow piston rod 27 is coupled with the piston 24 by a piston bolt 25 and a nut 26. The other end of the piston rod 27 extends through the outer shell 2, a rod guide 28 attached to an upper end of the cylinder 3, and a seal member 4 to the outside of the cylinder 3 and the outer shell 2.

An extension-side passage 29 and a compression-side passage 30 are formed through the piston 24 for connecting the cylinder upper chamber 3A and the cylinder lower chamber 3B. A damping force generating mechanism is disposed at the piston 24. The damping force generating mechanism is operable to generate a damping force by controlling a hydraulic fluid flow that passes through the extension-side passage 29 and the compression-side passage 30. The damping force generating mechanism comprises an extension-side disk valve 31, a compression-side disk valve 32 and an orifice 33.

A self-leveling mechanism L (pumping mechanism, returning mechanism) is included in the piston rod 27. The self leveling mechanism L is operable to adjust a vehicle height by supplying and receiving a hydraulic fluid between the cylinder 3 and the reservoir 11, and the oil tank 10.

The self-leveling mechanism L will now be described in detail. A pump tube 34 is inserted in the hollow piston rod 27, and is fixedly sandwiched between the piston bolt 25 and a spring 35. The tubular pump rod 36 is disposed in the cylinder 3 along an axis of the cylinder 3. A proximal end of the pump rod 36 extends through an opening of the base member 18, and is connected to the base guide 16. A small clearance or the orifice 23 is defined between the pump rod 36 and the opening of the base member 18. The cylinder lower chamber 3B and the oil chamber 19 (therefore reservoir 11) are in communication with each other through the orifice 23. A distal end of the pump rod 36 is slidably fitted in the pump tube 34, whereby a pump chamber 37 is defined in the pump tube 34. An oil passage 38 formed through the pump rod 36 is in communication with the oil chamber 17 through an oil passage 38A (second oil passage) formed through the base guide 16. Therefore, the oil passage 38 is in communication with the oil chamber 13 of the oil tank 10 through the oil passage 38A, the oil chamber 17, the passage on the lower end side of the holding member 15, and the oil passage 21.

The pump chamber 37 is in communication with the oil passage 38 in the pump rod 36 through a check valve 39 disposed at the distal end of the pump rod 36. The check valve 39 is adapted to allow only a hydraulic fluid flow from the oil passage 38 to the pump chamber 37. The pump chamber 37 is in communication with an annular oil passage 41 formed between the hollow piston rod 27 and the pump tube 34, through a check valve 40 disposed at an end of the pump tube 34. The oil passage 41 in turn is in communication with the cylinder upper chamber 3A. The check valve 40 is adapted to allow only a hydraulic fluid flow from the pump chamber 37 to the oil passage 41.

A groove 42 is formed on a side surface of the pump rod 36 so as to extend from the distal end of the pump rod 36 over a predetermined length along an axis of the pump rod 36. In a normal state, the pump chamber 37 is in communication with the cylinder lower chamber 3B through the groove 42. When the piston rod 27 contracts to a predetermined position, the communication between the groove 42 and the cylinder lower chamber 3B is cut off by the pump tube 34. A relief port 43 is formed by piercing a side wall of the pump rod 36. In a normal state, the relief port 43 is closed by the pump tube 34. When the piston rod 27 extends to a predetermined position, the pump tube 34 is displaced so that the relief port 43 is exposed, thereby establishing communication between the cylinder lower chamber 3B and the oil passage 38 in the pump rod 36.

A normally-closed relief valve 44 is disposed at the base guide 16. The relief valve 44 is adapted to open when a pressure on the oil chamber 19 side (therefore, the cylinder 3 and the reservoir 11 side having a high pressure) excessively increases to relieve the pressure to the chamber 17 side (therefore, the oil tank 10 side having a low pressure). An annular spring bearing 45 for receiving a lower end of a suspension spring (not shown) is fixedly fitted around the spring bearing support portion 6 of the outer shell 2. The hydraulic shock absorber 1 is mounted on a suspension apparatus of the vehicle by coupling a distal end of the piston rod 27 with a vehicle body side (not shown), and coupling a mounting eye 46 attached to the lower end of the outer shell 2 with a wheel side (not shown), and receives the lower end of the suspension spring by the spring bearing 45.

A seal structure of the oil tank 10 will now be described in further detail.

An upper end of the diaphragm 12 is configured to be fitted in an outer circumferential groove 47 formed at the outer flange portion 9 (fit portion) of the partition member 8, and is clamped between the outer circumferential groove 47 and an inner surface of an intermediate portion (small-diameter portion 2A formed above the bulge portion 5) of the outer shell 2, thereby providing a seal between the reservoir 11, and the oil chamber 13 and the gas chamber 14 of the oil tank 10. In addition, an outer circumferential groove 48 is formed at the outer flange portion 9 of the partition member 8 so as to axially extend toward the reservoir 11 side. An O-ring 49 is fitted in the outer circumferential groove 48, thereby providing a seal between the outer shell 2 and the outer flange portion 9. A lower end of the diaphragm 12 is configured to be fitted in an outer circumferential groove 50 formed at the annular member 20 (fit portion), and is clamped between the outer circumferential groove 50 and an inner surface of the lower end portion (small-diameter portion 2B formed below the bulge portion 5) of the outer shell 2, thereby providing a seal between the oil chamber 13 and the gas chamber 14.

The seal member 4 attached to the outer shell 2 and the upper end of the cylinder 3 is now described in detail. A seal cap 51 is fitted in the outer shell 2. The seal cap 51 air-tightly abuts against an upper portion of the rod guide 28. The rod guide 28 is fitted in the upper end of the cylinder 3 and is adapted to guide the piston rod 27. A packing case 52 abuts against an upper portion of the seal cap 51, and is screwed into the upper end of the outer shell 2, whereby the seal cap 51 and the rod guide 28 are fixed. An oil seal 53 for providing a seal between an inner surface of the packing case 52 and the piston rod 27 is disposed in the packing case 52, thereby preventing a hydraulic fluid and a gas from leaking.

The hydraulic shock absorber 1 configured as mentioned above functions as follows.

Extension and contraction of the piston rod 27 cause a sliding movement of the piston 24 in the cylinder 3, which generates a hydraulic fluid flow passing through the extension-side and compression-side oil passages 29 and 30 between the cylinder upper and lower chambers 3A and 3B. This hydraulic fluid flow is controlled by the extension-side and the compression-side disk valves 31 and 32 and the orifice 33 to generate a damping force. A volume change in the cylinder 3 caused by entry and exit of the piston rod 27 is compensated for by compression and expansion of the gas in the reservoir 11.

The hydraulic shock absorber 1 executes vehicle height adjustment as follows.

If the vehicle is empty, usually, the extension length of the piston rod 27 is within a predetermined standard range. In this state, since the pump chamber 37 is in communication with the cylinder lower chamber 3B through the groove 42 of the pump rod 36, extension and contraction of the piston rod 27 do not cause a pumping operation, and a height of the vehicle is maintained.

When the height of the vehicle is lowered due to, for example, an increase in weight of a load on the vehicle, and the extension length of the piston rod 27 is reduced to below the predetermined standard range, the pump tube 34 cuts off the communication between the groove 42 and the cylinder lower chamber 3B. In this state, extension and contraction of the piston rod 27 while the vehicle is running result in a pumping operation. During an extension stroke of the piston rod 27, retreat of the pump rod 36 causes expansion of the pump chamber 37, and thereby causes a decrease in the pressure in the pump chamber 37. Then, the check valve 39 is opened, and the hydraulic fluid in the oil chamber 13 of the oil tank 10 flows into the pump chamber 37 through the oil passage 21, the oil chamber 17, the oil passage 38A and the oil passage 38. During a contraction or compression stroke of the piston rod 27, advance of the pump rod 36 causes contraction of the pump chamber 37, and thereby causes an increase in the pressure in the pump chamber 37. Then, the check valve 40 is opened, and the hydraulic fluid flows from the pump chamber 37 into the cylinder lower chamber 3B through the oil passage 41 to cause extension of the piston rod 27. In this way, the pumping operation is repeated along with extension and contraction movements of the piston rod 27 while the vehicle is running, whereby the length of the piston rod 27 is increased and the height of the vehicle is raised. When the height of the vehicle reaches the predetermined standard range, communication between the pump chamber 37 and the cylinder lower chamber 3B is established through the groove 42 as mentioned above, whereby the pumping operation is ended.

When the height of the vehicle is raised due to, for example, a decrease in weight of a load on the vehicle, and the extension length of the piston rod 27 exceeds the predetermined standard range, the pump tube 34 is displaced so that the relief port 43 of the pump rod 36 is exposed to the cylinder lower chamber 3B, thereby establishing communication between the cylinder lower chamber 3B and the oil passage 38. Then, the hydraulic fluid in the cylinder lower chamber 3B is returned to the oil chamber 13 of the oil tank 10, whereby the length of the piston rod 27 is reduced so that the height of the vehicle is lowered. When the height of the vehicle is lowered, and the extension length of the piston rod 27 is reduced to within the predetermined standard range, the relief port 43 is closed by the pump tuber 34, and the height of the vehicle is maintained.

In this way, a pumping operation and a returning operation are repeated as necessary under extension and contraction of the piston rod 27 while the vehicle is running, whereby the extension length of the piston rod 27 can be adjusted so as to be within the predetermined standard range, and a constant height of the vehicle can be maintained automatically regardless of a weight of a load on the vehicle.

Figure 1A:
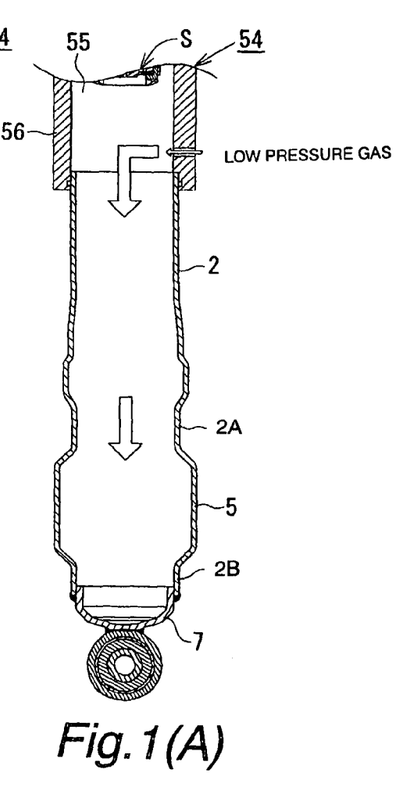
FIG. 1 is a process chart illustrating a method of assembling a hydraulic shock absorber with regard to a first embodiment of the present invention.
Figures 1B, 1C, 1D:
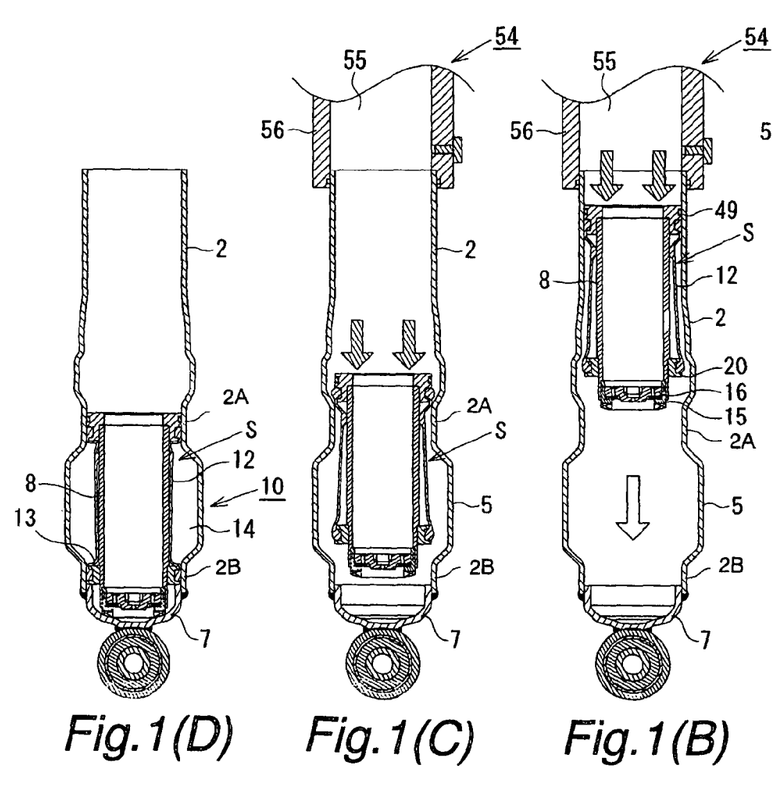

The method of assembling the hydraulic shock absorber 1 will now be described with reference to FIG. 1(A) to FIG. 1(D).

First, one end of the outer shell 2 is closed by welding the cap member 7 to the outer shell 2 (it may be closed by the closing method). Then, the oil tank 10 is formed by inserting an oil tank subassembly S from an open end of the outer shell 2 and fitting the subassembly S therein with use of an assembling apparatus 54. The oil tank subassembly S is formed by subassembling the partition member 8, the diaphragm 12, the holding member 15, the base guide 16, the annular member 20, and the O-ring 49.

The assembling apparatus 54 comprises a gas pressure chamber 55, a gas supply source (not shown) connected to the gas pressure chamber 55, and an inserting apparatus (not shown) disposed in the gas pressure chamber. A joint portion 56 is provided at the assembling apparatus 54. The joint portion 56 is adapted to be air-tightly fitted on and jointed with the opening portion of the outer shell 2 to communicate the inside of the outer shell 2 with the gas pressure chamber 55. The gas pressure chamber 55 and the inside of the outer shell 2 can be filled with a low-pressure gas having a predetermined pressure by jointing the opening portion of the outer shell 2 with the joint portion 56 and supplying the low-pressure gas having the predetermined pressure from the gas supply source. The inserting apparatus is adapted to set the oil tank subassembly S, insert the subassembly S from the gas pressure chamber 55 into the outer shell 2 jointed with the joint portion 56, and fit the subassembly S therein.

More specifically, as shown in FIG. 1(A), the oil tank subassembly S is set to the inserting apparatus of the assembling apparatus 54. The outer shell 2 with the cap 7 welded together therewith is jointed with the joint portion 56 of the assembling apparatus 54 so that the inside of the outer shell 2 is brought into communication with the gas pressure chamber 55. Then, the gas pressure chamber 55 and the inside of the outer shell 2 are filled with the low-pressure gas having the predetermined pressure by supplying thereto the low-pressure gas from the gas supply source.

As shown in FIG. 1(B), the oil tank subassembly S is inserted into the outer shell 2 with use of the inserting apparatus, while the gas pressure chamber 55 and the outer shell 2 are filled with the low-pressure gas having the predetermined pressure. Then, as shown in FIG. 1(C), the lower end of the diaphragm 12 attached to the annular member 20 at the lower end of the partition member 8 is pressed in to the inner surface of the small diameter portion 2B below the bulge portion 5 of the outer shell 2. In addition, the O-ring 49 attached to the flange portion 9 at the upper end of the partition member 8, and the upper end of the diaphragm 12 are pressed in to the inner surface of the small diameter portion 2A above the bulge portion 5 of the outer shell 2. By this assembly, the gas chamber 14 is formed between the bulge portion 5 of the outer shell 2 and the diaphragm 12, as shown in FIG. 1(D). After that, the outer shell 2 is detached from the joint portion 56 of the assembling apparatus 54. At this phase, since the outer shell 2 is filled with the gas having the predetermined pressure, the low-pressure gas having the predetermined pressure is sealingly contained in the gas chamber 14. In this state, the diaphragm 12 is pressed to the outer surface of the partition member 8 by the pressure of the low-pressure gas in the gas chamber 14, and therefore the oil chamber 13 is contracted.

In this state, since a pressure receiving area on the axially upper side of the partition member 8 and a pressure receiving area on the axially lower side of the partition member 8 which receive the low-pressure gas in the gas chamber 14 are substantially equal (a difference between the pressure receiving areas is zero), almost no axial force which acts on the partition member 8 is generated by the pressure of the low-pressure gas. Therefore, it is possible to securely hold the oil tank subassembly S due to a frictional force generated by pushing the subassembly S into the outer shell 2, whereby the oil tank subassembly S can be prevented from moving out of the outer shell 2.

After the oil tank subassembly S is placed in the outer shell 2, the inner components, such as the cylinder 3, the pump rod 36, the piston 24 and the piston rod 27, are placed in the outer shell 2, and then a hydraulic fluid is supplied therein. The seal member 4 is attached to the outer shell 2 to close the opening of the outer shell 2. After that, a high-pressure gas having a predetermined pressure is supplied into an upper portion of the reservoir 11 from a high-pressure-gas supplying hole that is formed adjacent the upper end of the outer shell 2 (a portion below the seal cap 51)), and the high-pressure-gas supplying hole is closed by, for example, welding. It should be noted that, since no diaphragm is disposed in the reservoir 11, deterioration of and damage to a diaphragm, which may otherwise be caused by the welding process, can be avoided.

The hydraulic shock absorber 1 can be assembled in this way. It is not necessary to form a gas-supplying hole for supplying a gas therefrom at the bulge portion 5 of the outer shell 2 which cooperates with the diaphragm 12 of the oil tank 10 to define the gas chamber 14. Therefore, a process for closing a gas-supplying hole by, for example, welding is not necessary, whereby it is possible to prevent deterioration and damage of the diaphragm 12 which may otherwise be caused by welding heat and sputter.

Figure 4:
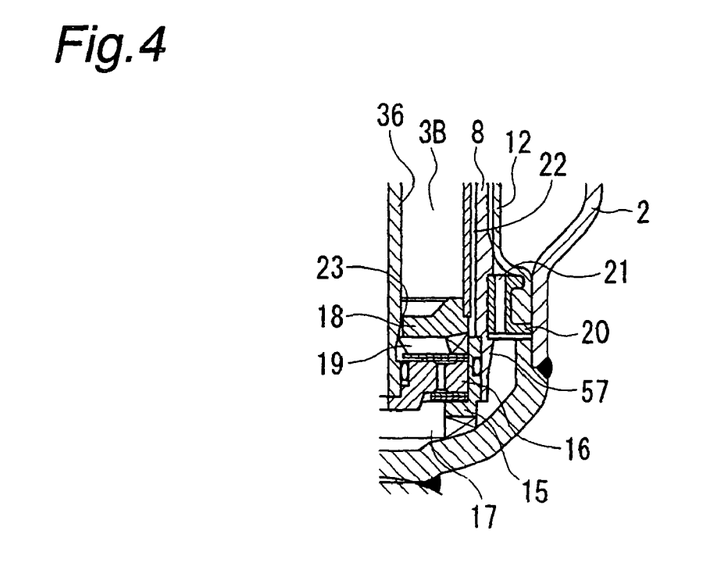
FIG. 4 is an enlarged vertical cross-sectional view illustrating main portions of a variation of the hydraulic shock absorber shown in FIG. 2.

As shown in FIG. 4, in the first embodiment, a tapered engagement protrusion 57 may be formed along an outer circumference of the tip portion of the partition member 8 where the annular member 20 of the oil tank subassembly S is fitted. After the annular member 20 is fittedly pressed onto the partition member 8, the annular member 20 can be prevented from being detached due to a stepped portion of the engagement protrusion 57.

Hereinbelow, each of a second embodiment to a fourth embodiment of the present invention will be described. Elements corresponding to the elements in the above-discussed first embodiment will be denoted by the same reference numerals as those used in the first embodiment, and detailed description will be made below only as to elements and features that are different from or absent in the first embodiment.

Figures 3A, 3B:
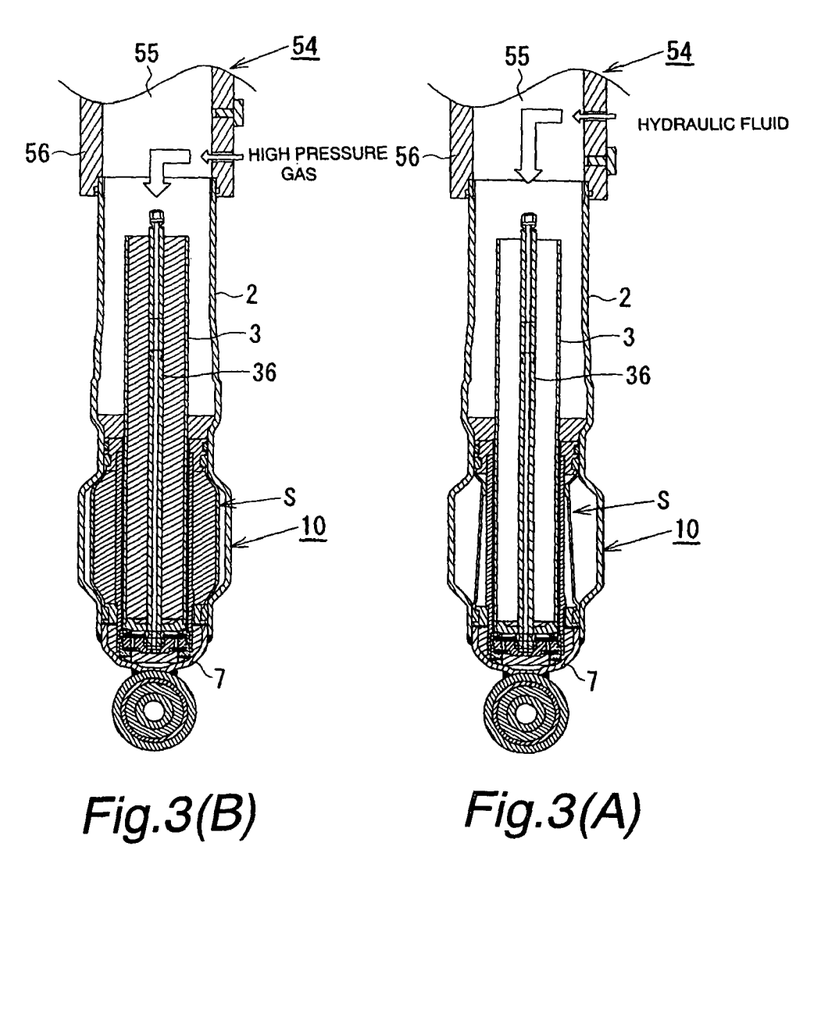
FIG. 3 is a process chart illustrating a method of assembling a hydraulic shock absorber with regard to a second embodiment of the present invention.
Figure 3C:
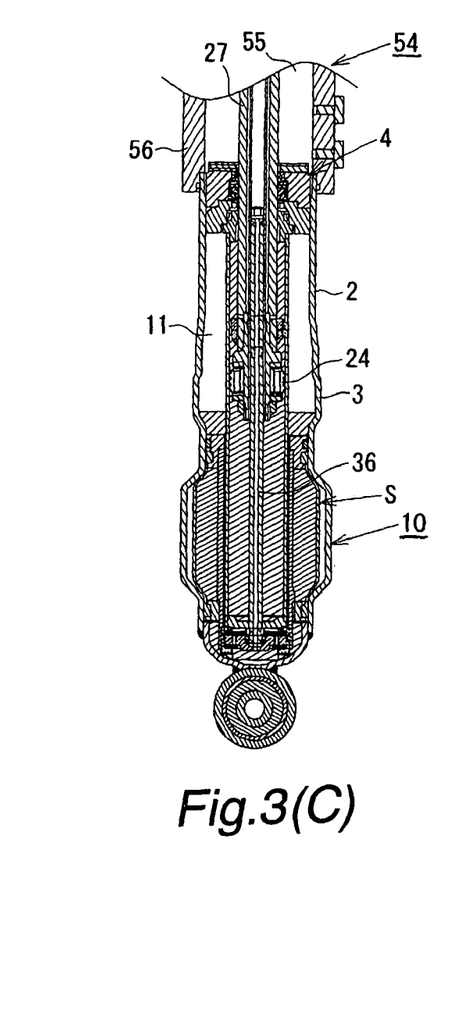

Another method of assembling the hydraulic shock absorber 1 as the second embodiment of the present invention will now be described with reference to FIG. 3(A) to FIG. 3(C). In the second embodiment, a hydraulic fluid supply source (not shown) is disposed at an assembling apparatus 54. First, the oil tank subassembly S is placed in the outer shell 2. Next, without detaching the outer shell 2 from a joint portion 56 of the assembling apparatus 54, the inner components such as the cylinder 3 and the pump rod 36 are placed in the outer shell 2 with use of an inserting apparatus, as shown in FIG. 3(A). Then, a predetermined amount of a hydraulic fluid is supplied from the hydraulic fluid supply source into the outer shell 2. In FIGS. 3(B) and 3(C), shading denotes areas filled with the hydraulic fluid.

After that, as shown in FIG. 3(B), a high-pressure gas having a predetermined pressure is supplied from a gas supply source into the case. Then, as shown in FIG. 3(C), the remaining inner components such as the piston 24 and the piston rod 27 are placed therein with use of the inserting apparatus. The seal member 4 is attached to the outer shell 2 to close the opening of the outer shell 2 under the pressure of the high-pressure gas.

The hydraulic shock absorber 1 can be assembled in this way. By using this assembling method, it is possible to obviate a need for a high-pressure-gas supplying hole for the reservoir 11, and it is possible for the outer shell 2 to be entirely free of any gas supplying hole.

The third embodiment of the present invention will now be described with reference to FIG. 5. The third embodiment is employed in assembling a hydraulic shock absorber in which an oil chamber and a gas chamber of an oil tank are defined by a free piston.

Figure 5:
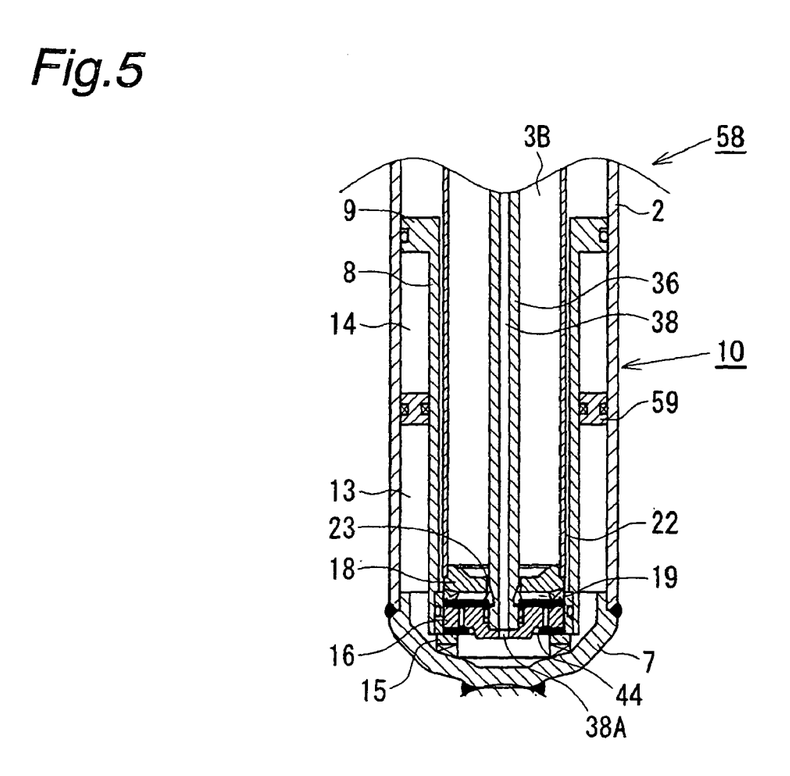
FIG. 5 is an enlarged vertical cross-sectional view illustrating an oil tank of a hydraulic shock absorber with regard to a third embodiment of the present invention.

As shown in FIG. 5, in a hydraulic shock absorber 58 with regards to the third embodiment, a bulge portion 5, a diaphragm 12 and an annular member 20 are omitted from an oil tank 10, and instead, an annular free piston 59 is slidably fitted between a partition member 8 and an outer shell 2. A lower oil chamber 13 and an upper gas chamber 14 are defined by the free piston 59, whereby the hydraulic shock absorber 58 can function in the same manner as the hydraulic shock absorber of the first embodiment does.

The hydraulic shock absorber 58 is assembled as follows. As is the case in the first embodiment, the outer shell 2 with a cap 7 welded together therewith is jointed with a joint portion 56 of an assembling apparatus 54, and a low-pressure gas is supplied from a gas supply source so that a gas pressure chamber 55 and the outer shell 2 are filled with the low-pressure gas. An oil tank subassembly S' (which is similar to the subassembly S of the first embodiment, except that, in the subassembly S', a diaphragm 12 and an annular member 20 are omitted and the free piston 59 is fitted onto the partition member 8) is inserted into the outer shell 2 to form an oil tank 10 with use of an inserting apparatus under the pressure of the low-pressure gas. At this time, it is preferable to restrain a movement of the free piston 59 when the oil tank subassembly S' is inserted into the outer shell 2. This is achieved by attaching a retaining ring (not shown) at an appropriate position on the partition member 8 so that a required volume of the gas chamber 14 can be secured.

After that, as is the case in the first embodiment, the outer shell 2 is detached from the joint portion 56 of the assembling apparatus 54, and the inner components are put in place. Then hydraulic fluid is supplied into the outer shell 2 and a seal member 4 is attached to the outer shell 2 to sealingly close an opening of the outer shell 2. After that, a high-pressure gas is supplied to be sealingly contained in a reservoir 11 whereby assembly of the hydraulic shock absorber 58 is completed. Alternatively, the hydraulic shock absorber 58 may be assembled in the same manner as in the second embodiment; that is, all of the inner components may be placed in the outer shell 2 with use of the assembling apparatus 54, and a hydraulic fluid and a high-pressure gas may be supplied and then the outer shell 2 may be sealingly closed by the seal member 4.

The fourth embodiment of the present invention will now be described with reference to FIG. 6.

The fourth embodiment is employed in assembling a hydraulic shock absorber similar to that disclosed in Japanese Patent Application Public Disclosure No. Hei 10-138730. A hydraulic shock absorber assembled by the fourth embodiment comprises a reservoir formed at a lower portion of an outer shell, and an oil tank formed at an upper portion of the outer shell. In the reservoir, an oil chamber and a gas chamber are defined by a diaphragm. In the oil tank, there is no oil chamber and gas chamber defined by a partition or diaphragm.

Figure 6:
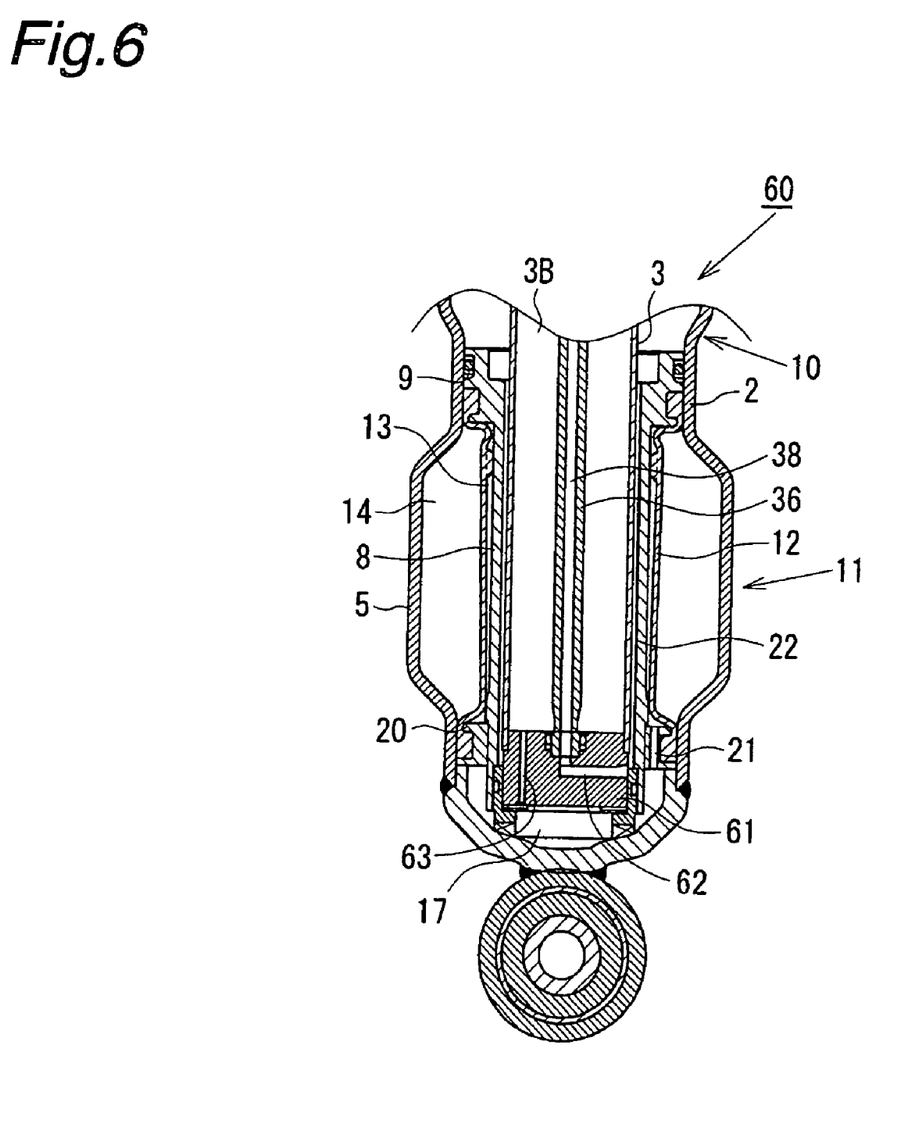
FIG. 6 is an enlarged vertical cross-sectional view illustrating a reservoir of a hydraulic shock absorber with regard to a fourth embodiment of the present invention.

As shown in FIG. 6, in a hydraulic shock absorber 60 with regard to the fourth embodiment, a reservoir 11 is formed at a lower portion between an outer shell 2 and a cylinder 3, and an oil tank 10 is formed at an upper portion between the outer shell 2 and the cylinder 3. The oil tank 10 does not have an oil chamber and a gas chamber defined therein. The reservoir 11 has a similar structure to that of the oil tank 10 of the first embodiment; in the reservoir 11, an oil chamber 13 and a gas chamber 14 are defined by a diaphragm 12 attached to a partition member 8.

A base member 61 is disposed at a lower end of the cylinder 3, and a pump rod 36 is coupled with the base member 61. An oil passage 62 and an oil passage 63 are formed through the base member 61. The oil passage 62 connects an oil passage 38 of the pump rod 36 to an annular oil passage 22 formed between the cylinder 3 and the partition member 8. The oil passage 63 connects the inside of the cylinder 3 to an oil chamber 17. The oil passage 38 of the pump rod 36 and the oil tank 10 are connected to each other through the oil passage 62 and the annular oil passage 22. A cylinder lower chamber 3B and the oil chamber 13 of the reservoir 11 are in communication with each other through the oil passage 63, the oil chamber 17 and an oil passage 21 of an annular member 20. By this structure, the hydraulic shock absorber 60 can function in the same manner as the hydraulic shock absorber of the first embodiment does.

For assembling the hydraulic shock absorber 60, a similar method to the assembling method of the first embodiment can be employed, although, instead of a low-pressure gas, a high-pressure gas is supplied into a gas pressure chamber 55 of an assembling apparatus 54 so that the reservoir 11 can be formed under a pressure of the high-pressure gas. Alternatively, for assembling the hydraulic shock absorber 60, a similar method to the assembling method of the second embodiment can be employed, although, instead of a high-pressure gas, a low-pressure gas is supplied into a gas pressure chamber 55 of an assembling apparatus so that the oil tank can be formed under a pressure of the low-pressure gas.

In this way, according to the above-described embodiments, it is possible to improve a method of assembling a hydraulic shock absorber in which two kinds of gases having different pressures are sealingly contained. In a conventional method, after all components are in place and a hydraulic fluid is supplied, gases should be supplied from holes formed through an outer shell, which contributes to an increase in a required number of processes. On the other hand, in a method according to the present invention, at least one kind of gas can be supplied without requiring hole forming, whereby problems associated with contamination and the number of man-hour can be solved.

As mentioned above, according to the before-described embodiments, a need for a gas-supplying hole for supply of gas into a gas chamber can be obviated.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-284509, filed on Oct. 31, 2007.

The entire disclosure of Japanese Patent Application No. 2007-284509 filed on Oct. 31, 2007 including specification, claims, drawings and summary is incorporated herein by reference in its entirety.

What is claimed is:

1. A method of assembling a hydraulic shock absorber, the method comprising, in the following order:
providing a bottomed cylindrical outer shell having an opening at one end;
introducing a first gas having a first pressure from the opening into the outer shell without forming a gas-supplying hole through an outer side wall of the outer shell;
inserting a dividing member into the outer shell under the pressure of the first gas to define a gas chamber in the outer shell, such that the first gas is sealingly contained in the gas chamber;
placing inner components in the outer shell;
supplying a hydraulic fluid into the outer shell; and
supplying into the outer shell a second gas having a second pressure which is different from the first pressure.

2. A method of assembling a hydraulic shock absorber according to claim 1, wherein the dividing member comprises a flexible membrane.

3. A method of assembling a hydraulic shock absorber according to claim 1, wherein the dividing member comprises a free piston.

4. A method of assembling a hydraulic shock absorber according to claim 1, wherein the opening at the one end of the outer shell is sealingly closed by a sealing device after the second gas is supplied.

5. A method of assembling a hydraulic shock absorber according to claim 1, wherein the second gas is supplied after the opening at the one end of the outer shell is sealingly closed by a sealing device.

6. A method of assembling a hydraulic shock absorber having:
a bottomed cylindrical outer shell having an opening at one end;
a cylinder disposed in the outer shell and sealingly containing a hydraulic fluid;
a piston slidably fitted in the cylinder;
a piston rod having one end coupled with the piston, and an opposite end extending to the outside of the cylinder;
a damping force generating mechanism operable to generate a damping force by controlling a hydraulic fluid flow generated by a movement of the piston;
a cylindrical chamber defined between the outer shell and the cylinder;
a first chamber defined in the cylindrical chamber, the first chamber comprising a gas chamber which is disposed on an outer circumferential side of the first chamber and in which a first gas is sealingly contained, an oil chamber disposed on an inner circumferential side of the first chamber, and a substantially cylindrical diaphragm dividing the inside of the first chamber into the gas chamber and the oil chamber;
a second chamber defined in the cylindrical chamber, the second chamber containing a mixture of a hydraulic fluid and a second gas;
a communication passage connecting one of the first and second chambers, and the inside of the cylinder;
a pumping mechanism operable to supply the hydraulic fluid in the other of the first and second chambers into the cylinder by utilizing extension and contraction of the piston rod; and
a returning mechanism operable to discharge the hydraulic fluid in the cylinder into the other of the first and second chambers by opening when the piston rod extends more than a predetermined value, the method comprising, in the following order:

introducing the first gas from the opening into the outer shell without forming a gas-supplying hole through an outer side wall of the outer shell;

inserting the diaphragm into the outer shell under a pressure of the first gas;

inserting the cylinder into the outer shell;

supplying the hydraulic fluid into the cylinder; and supplying the second gas into the second chamber.

7. A method of assembling a hydraulic shock absorber according to claim 6, wherein the first chamber is formed on a bottom side of the outer shell.

8. A method of assembling a hydraulic shock absorber according to claim 7, wherein a cylindrical member for defining the oil chamber is disposed inside the diaphragm, and the communication passage is defined between the cylindrical member and the cylinder.

9. A method of assembling a hydraulic shock absorber according to claim 8, wherein the cylindrical member and the diaphragm are subassembled.

10. A method of assembling a hydraulic shock absorber according to claim 6, wherein small-diameter portions are formed at two axial portions of the outer shell, and each end of the diaphragm is sealingly held by a respective one of the small-diameter portions.

11. A method of assembling a hydraulic shock absorber according to claim 10, wherein the first gas is introduced into the gas chamber when the diaphragm is inserted beyond one of the small-diameter portions.

12. A method of assembling a hydraulic shock absorber according to claim 6, wherein the opening at the one end of the outer shell is sealingly closed by a sealing device after the second gas is supplied.

13. A method of assembling a hydraulic shock absorber according to claim 6, wherein the second gas is supplied after the opening at the one end of the outer shell is sealingly closed by a sealing device.

14. A hydraulic shock absorber, comprising:

a cylinder sealingly containing a hydraulic fluid;

a piston slidably fitted in the cylinder;

a piston rod having one end coupled with the piston, and an opposite end extending to the outside of the cylinder;

a damping force generating mechanism operable to generate a damping force by controlling a hydraulic fluid flow generated by a movement of the piston;

a reservoir connected to the cylinder and sealingly containing a hydraulic fluid and a gas;

an oil tank in which a hydraulic fluid is reserved; and a self-leveling mechanism operable to adjust an extension length of the piston rod by supplying and receiving the hydraulic fluid between the cylinder and the oil tank by utilizing extension and contraction of the piston rod, wherein an outer shell is disposed around the cylinder to define a chamber between the cylinder and the outer shell;

a partition member is inserted between the cylinder and the outer shell so that the inside of the chamber is divided into a first chamber and a second chamber by the partition member;

the inside of the first chamber is divided into an oil chamber and a gas chamber by a movable dividing member;

a gas having a predetermined pressure is sealingly contained in the gas chamber; and the gas is supplied and sealingly contained into the gas chamber by inserting the dividing member into the outer shell under the pressure of the gas having the predetermined pressure, without providing a gas-supplying hole through an outer side wall of the outer shell for supplying the gas.

15. A hydraulic shock absorber according to claim 14, wherein the partition member has a cylindrical shape, and is prevented from moving out of the outer shell after being inserted in the outer shell due to the pressure of the gas in the gas chamber.

16. A hydraulic shock absorber according to claim 15, wherein the partition member is air-tightly fitted at a lower end portion and an intermediate portion of the outer shell, and an axial force generated by a difference between a pressure receiving area at a fit portion of the partition member to the lower end portion and a pressure receiving area at a fit portion of the partition member to the intermediate portion is less than a frictional force at the fit portions.

17. A hydraulic shock absorber according to claim 16, wherein the difference between the pressure receiving areas is zero.

* * * * *